United States Patent
Davies

(10) Patent No.: US 10,070,142 B2
(45) Date of Patent: Sep. 4, 2018

(54) CONTINUOUS GENERATION OF NON-DISPLAYED REFERENCE FRAME IN VIDEO ENCODING AND DECODING

(71) Applicant: Cisco Technology, Inc., San Jose, CA (US)

(72) Inventor: Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 14/538,272

(22) Filed: Nov. 11, 2014

(65) Prior Publication Data

US 2016/0134882 A1    May 12, 2016

(51) Int. Cl.
| | |
|---|---|
| *H04N 19/44* | (2014.01) |
| *H04N 19/50* | (2014.01) |
| *H04N 19/172* | (2014.01) |
| *H04N 19/174* | (2014.01) |
| *H04N 19/164* | (2014.01) |
| *H04N 19/23* | (2014.01) |

(52) U.S. Cl.
CPC ......... *H04N 19/44* (2014.11); *H04N 19/164* (2014.11); *H04N 19/172* (2014.11); *H04N 19/174* (2014.11); *H04N 19/23* (2014.11); *H04N 19/50* (2014.11)

(58) Field of Classification Search
CPC ...... H04N 19/172; H04N 19/44; H04N 19/50; H04N 19/164; H04N 19/174; H04N 19/23
See application file for complete search history.

(56) References Cited

U.S. PATENT DOCUMENTS

| | | | | |
|---|---|---|---|---|
| 6,078,619 | A * | 6/2000 | Monro | H04N 19/503 375/240 |
| 6,909,806 | B2 | 6/2005 | Li | |
| 6,912,313 | B2 | 6/2005 | Li | |
| 7,321,624 | B1 * | 1/2008 | Allmen | H04N 19/172 375/240.08 |
| 8,107,527 | B1 | 1/2012 | Hobbs et al. | |
| 2005/0024487 | A1 | 2/2005 | Chen | |

(Continued)

FOREIGN PATENT DOCUMENTS

EP    1560434 A2    8/2005

OTHER PUBLICATIONS

Bankoski et al., "Technical Overview of VP8, An Open Source Video Codec for the Web", Jul. 2011, 2011 IEEE International Conference on Multimedia and Expo (ICME), 6 pages.

(Continued)

*Primary Examiner* — Anner N Holder
(74) *Attorney, Agent, or Firm* — Edell, Shapiro & Finnan, LLC

(57) ABSTRACT

Methods and systems for the transmission of a high quality background reference frame (HQRF). Such a reference frame is sent from a video encoder to a video decoder in a number of portions, or slices. In the context of this description, a slice of a frame is a set of blocks in the frame, where the slice is coded separately from other slices of the frame. The slices are sent at respective intervals, so that the decoder receives the high quality background reference frame over time, in a piecemeal fashion. The slices can be buffered at the decoder, and the buffer may be continuously updated and used for reference at any point.

23 Claims, 11 Drawing Sheets

(56) References Cited

U.S. PATENT DOCUMENTS

| | | | | |
|---|---|---|---|---|
| 2008/0123747 A1* | 5/2008 | Lee | ......................... | H04N 19/20 |
| | | | | 375/240.16 |
| 2012/0169923 A1* | 7/2012 | Millar | .................... | H04N 19/85 |
| | | | | 348/399.1 |
| 2012/0170654 A1* | 7/2012 | Zhang | ..................... | H04N 7/26 |
| | | | | 375/240.16 |

OTHER PUBLICATIONS

Martinez-Martin et al., "Chapter 2—Motion Detection in Static Backgrounds", Robust Motion Detection in Real-Life Scenarios, Jul. 2012, 39 pages.
Bankoski et al., "VP8 Data Format and Decoding Guide", Nov. 2011, Google Inc., 299 Pages. (Parts 1, 2 &3).
Miska M. Hannuksela et al., "H.264/AVC in Wireless Environments", IEEE Transactions on Circuits and Systems for Video Technology, IEEE Service Center, Piscataway, NJ, US, vol. 13, No. 7, Jul. 2003, XP011099258, ISSN: 1051-8215, 17 pages.
Peter Lambert et al., "A Real-Time Content Adaption Framework for Exploiting ROI Scalability in H.264/AVC", Jan. 1, 2006, Advanced Concepts for Intelligent Vision Systems Lecture Notes in Computer Science, Berlin, DE, XP019043365, ISBN: 9783-540-44630-9, 12 pages.
Dan Grois et al., "Recent Advances in Region-of-interest Video Coding", In: "Recent Advances on Video Coding", Jul. 5, 2011, InTech, XP055257835, ISBN: 978-953-30-7181-7, DOI: 10.5772/17789, 29 pages.
Extended European Search Report in corresponding European Application No. 151934783, dated Mar. 31, 2016, 10 pages.

\* cited by examiner

CONTINUOUS GENERATION OF NON-DISPLAYED REFERENCE FRAME IN VIDEO ENCODING AND DECODING

TECHNICAL FIELD

The present disclosure relates to composite background reference frames in video processing.

BACKGROUND

In low bit rate video conferencing, much of the displayed video is static and represents a relatively unchanging background. This could be well predicted if a good representation of it could be transmitted to the decoder, and having a high quality background saves bits that could be used on the foreground speaker. Unfortunately, when the bit rate is low, the background cannot generally be transmitted in high quality. The frame size required would be too large: sending such a frame may cause packet loss, dropped frames and extra latency. All of these phenomena would diminish the viewing experience for a user.

An approach within existing technology might be to increase the quality of the video by focusing on different regions alternately, to spread the extra bits of the high quality background across a number of frames. Useful though this approach might be, it has some limitations. One is that the amount of enhancement available is still limited by the need to keep within a frame budget; another is that accumulating a full high-quality reference frame requires many frames with high quality regions to be stored to cover the whole frame area pertaining to the background. This is onerous for the encoder and the decoder, requires more complex encoder reference selection and is inefficient in coding terms as many different reference indices must be encoded.

Another option would be to specify an alternative reference frame. This would be a reference frame that need not be displayed, and in that sense would be artificial. However, transmitting a whole frame would be difficult, since this would therefore require a large amount of bandwidth. Moreover, such a frame could not be incrementally updated except by retransmitting an entire new alternative reference frame.

DESCRIPTION OF EXAMPLE EMBODIMENTS

Overview

Methods and systems are described herein for the transmission and maintenance of a high quality background reference frame (HQRF). Such a reference frame is sent from a video encoder to a video decoder in a number of portions, or slices. In the context of this description, a slice of a frame is a portion of the frame composed of a set of blocks in the frame, where the slice, or portion, is coded separately from other slices of the frame. The slices are sent at respective intervals, so that the decoder receives the high quality background reference frame over time, in a piecemeal fashion. The slices can be buffered at the decoder, and the buffer may be continuously updated and used for reference at any point.

Example Embodiments

Figure 1:
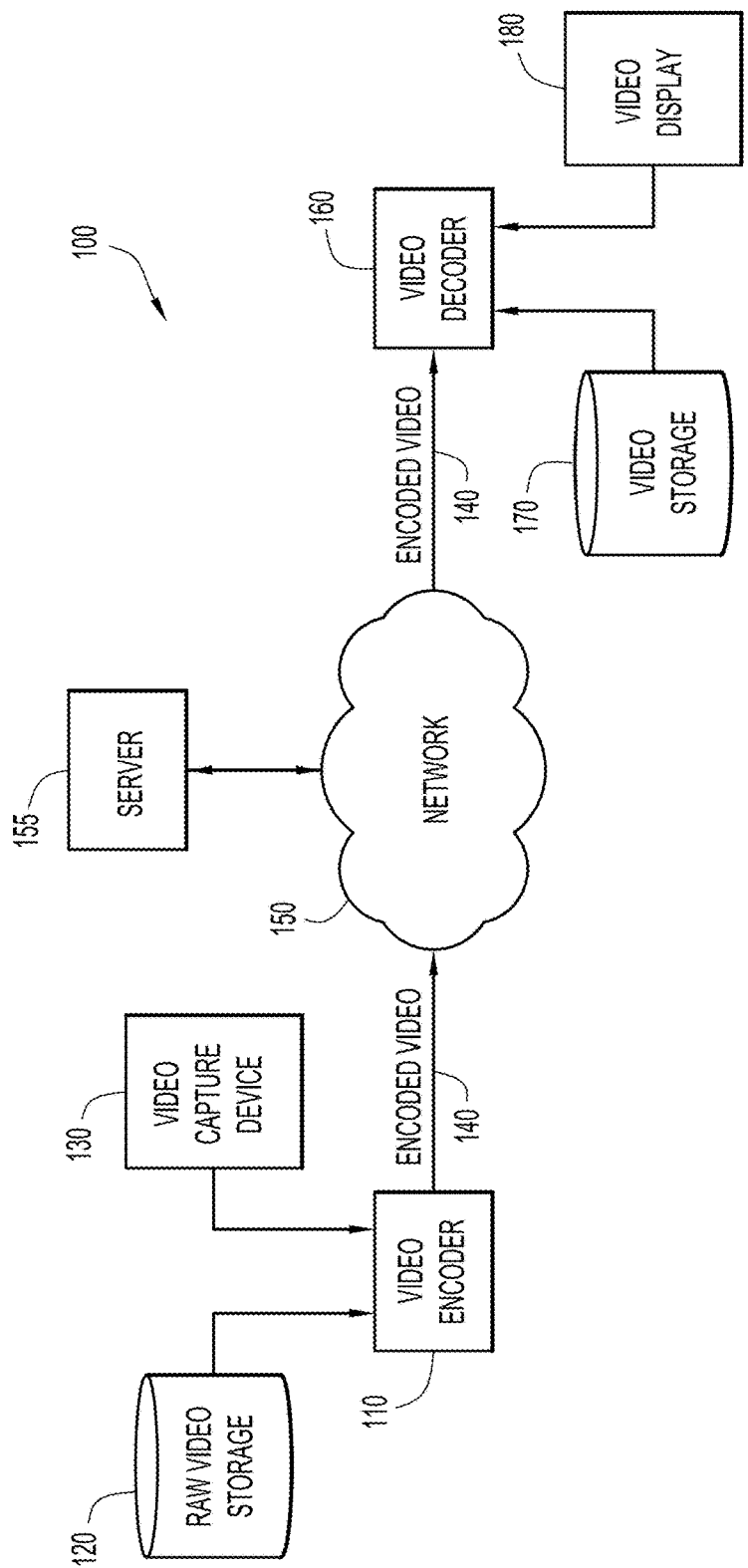
FIG. 1 is a block diagram of a system incorporating the functionality described herein, according to an example embodiment.

A video communications system 100 is shown generally in FIG. 1. A video encoder 110 is shown in communication with a video decoder 160, such that encoded video 140 is generated at encoder 110 and sent to decoder 160. The encoded video 140 may be generated from any of several inputs. For example, a video capture device 130 such as a camera may represent a source of video to be input to video encoder 110. Alternatively, raw video may be stored at a storage device 120, from which it may be sent to the encoder 110.

In an embodiment, the video encoder 110 and decoder 160 may function in the context of a video conferencing system. The communications path between video encoder 110 and decoder 160 passes through a data network 150 in the illustrated embodiment. A server 155 may also be connected to the network 150. In a video conferencing system, encoded video 140 may be sent by video encoder 110 and received at the server 155 where further processing may be performed (e.g., combining with other video streams), and from which the encoded video 140 may be obtained by video decoder 160.

Once encoded video 140 is decoded at decoder 160, a variety of functions may take place, such as picture reconstruction and image analysis. The resulting video output may then be stored at a video storage device 170 and/or displayed at a video display device 180, for example.

Figure 2:
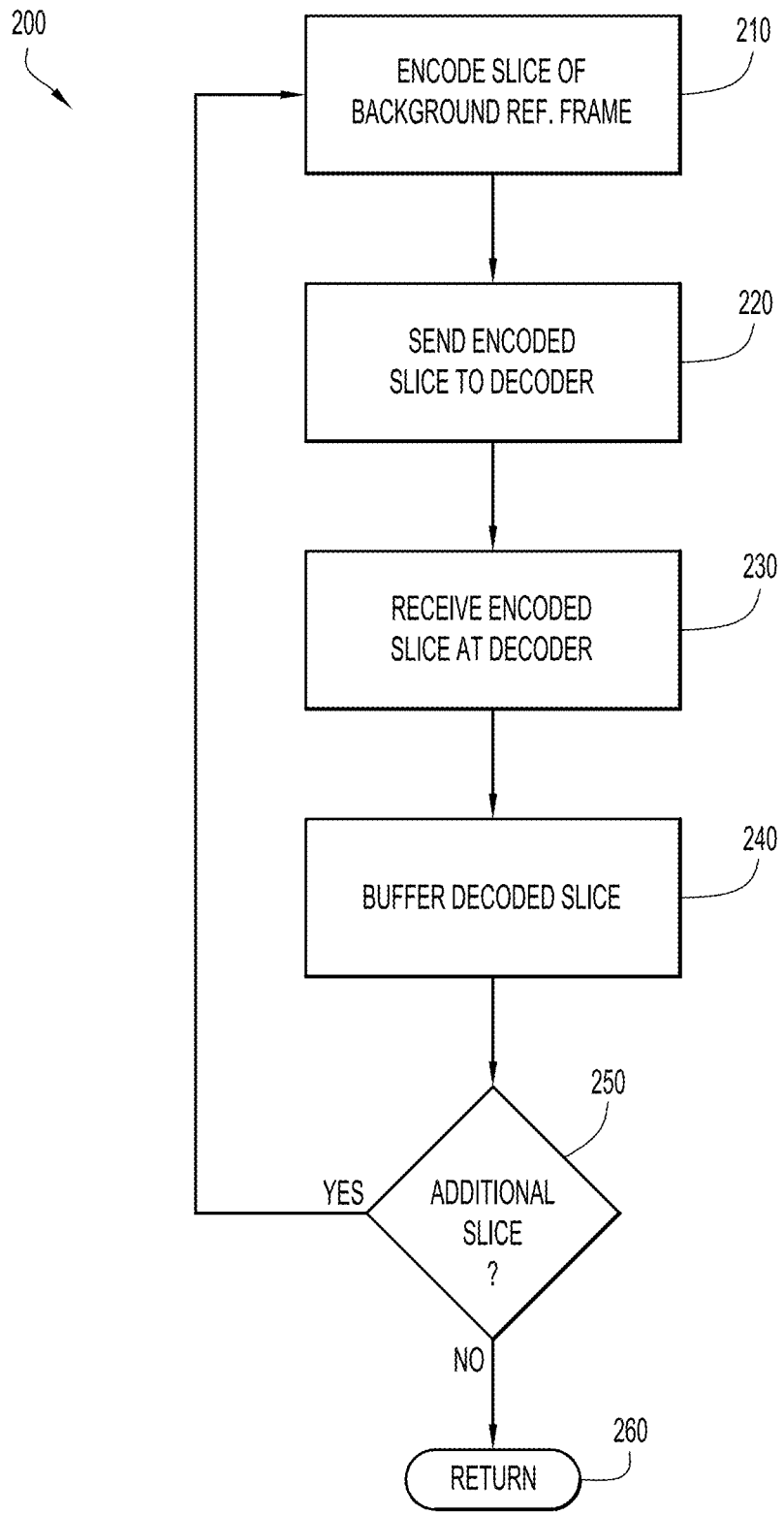
FIG. 2 is a flowchart illustrating the processing described herein, according to an example embodiment.

Overall processing of the systems described herein is illustrated in FIG. 2, according to an embodiment. At 210, a slice of a background reference frame may be encoded at the video encoder. In an embodiment, the background reference frame is a relatively high quality (i.e., high fidelity) frame. In the context of this description, high fidelity refers to the relative absence of processing artifacts and the faithfulness of the representation. As noted above, this reference frame may be an HQRF. At 220, the encoded slice is sent to the decoder. At 230, the encoded slice is received at the decoder. After decoding and related processing, the decoded slice may be stored in a buffer. In an embodiment, this buffer may be a dedicated buffer for the storage of the background reference frame. If additional data is available (as determined at 250), the process reiterates at 210.

While the illustrated embodiment shows the encoding of the background reference frame happening at each iteration for one slice at a time, in an alternative embodiment several slices of background reference frame may be encoded at once, and subsequent iterations may begin at 220 instead.

In an embodiment, a background reference frame may already be in place when the process of FIG. 2 begins. Such an initial background reference frame may be a default background reference frame, or a relatively low fidelity background reference frame, for example.

In an embodiment, the iterations may take place over time, such that data for the background reference frame may be sent to the decoder over a period of seconds or minutes, or indeed indefinitely. In various embodiments, each slice may represent 1% to 2% of the entire frame area. The time interval between each transmission may be anywhere from 0.5 seconds to 5 seconds for various embodiments. In alternative embodiments, the time intervals may be less than or greater than values in this range. Moreover, the transmission of a slice may or may not coincide with transmission of other video data to the decoder.

In an embodiment, the background reference frame may be used for prediction at any point even if data representing the entire frame area had not been received, and indeed data representing the entire frame area may never be received throughout the duration of the video stream. Incomplete regions of the background reference frame may contain data from another reference frame, or data representing a constant tone color for example.

In some situations, the background may change over time. The background image may change for a variety of reasons. Objects or colors in the background might change. Graphics may need to be inserted or removed. Text may need to be added or removed. To accommodate such situations, the background reference frame may need to be updated.

The update process may have various embodiments. For example, a change may be explicitly signaled by the encoder, by sending a command to the decoder along with one or more updated slices. If multiple slices are required, these may be sent over time in a manner similar to what is shown in FIG. 2.

Alternatively, the need for an update may be implicit. One or more slices may be provided by the encoder to the decoder, and the decision may be left to the decoder as to whether the received slice should be used to update the buffered background reference frame. Such a decision may be based on one or more quality metrics calculated for the received slice(s) and the corresponding slice(s) of the buffered background reference frame. If the relative metrics suggest that the received slices should be used to update the buffered background reference frame, then the slices will be used to overwrite the corresponding portion of the frame.

Since the background reference frame may not contain a complete representation of the frame area, updates to existing areas may be received before any data has been received for other areas. Updates may consist of slice data that straddles areas where data has already been received and areas where no data has previously been received.

Since the background reference frame may be used for prediction at any point, updates to the background reference frame may be predictively coded using data in the background reference frame as well as other frames in the reference frame buffer.

Figure 3:
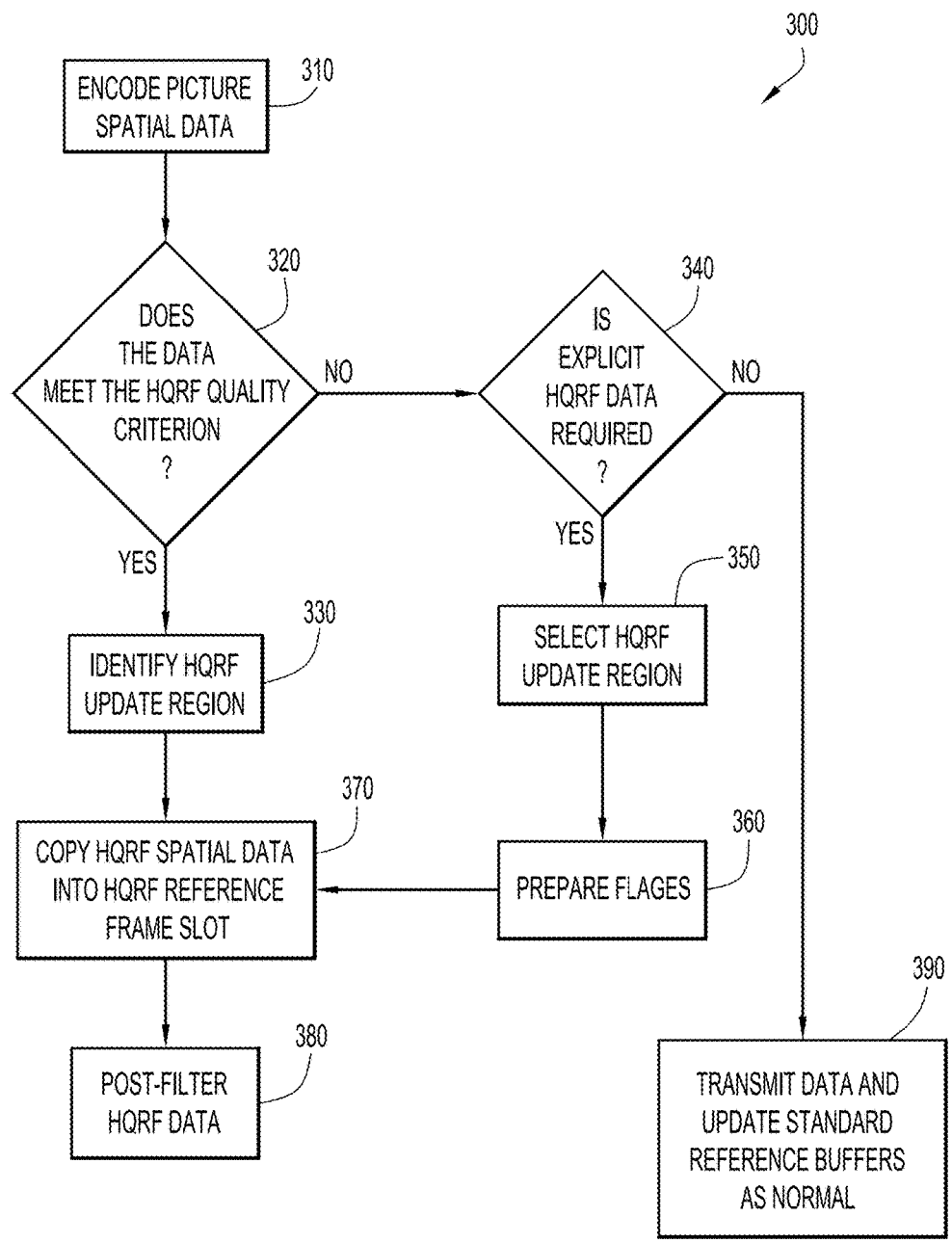
FIG. 3 is a flowchart illustrating an update process at an encoder, according to an example embodiment.

An embodiment of the update process is illustrated in FIG. 3 from the video encoder's perspective. At 310, picture data is encoded, where this data may represent at least a portion of a high-quality background reference frame (HQRF). The encoded portion may be one or more slices, for example. At 320, a determination is made as to whether the encoded data meets one or more predefined quality criteria (e.g., an acceptable quality parameter (QP)). If so, then at 330 the region of the HQRF corresponding to the encoded data is identified. At 370, the encoded data (i.e., the encoded HQRF spatial data) is copied into the appropriate location in the background reference frame maintained at the encoder. At 380, any necessary filtering is performed on the HQRF, and at 390 the data is transmitted to the decoder. In addition, the reference buffer(s) at the encoder are updated as necessary.

If the one or more quality criteria are not met at 320, then at 340 a determination is made as to whether explicit HQRF data is required. This represents a situation where there is an explicit need for an update of the background reference frame. Examples may include the addition of a graphic or text. If present, such graphics or text would be present in the data encoded at 310. If explicit HQRF data is required, then at 350 the particular region to be updated in the HQRF is identified. At 360, flags that explicitly indicate the need for update of the HQRF are prepared. Such flags may be used as instructions or commands to the decoder, indicating that an update to the background reference frame is to be performed. The process then continues at 370. Filtering is performed at 380, and the encoded slice(s) are transmitted at 390 with the necessary flags.

If it is determined at 340 that explicit HQRF data is not required, the process continues at 390, where the encoded data is transmitted. In an embodiment, the decoder may then determine whether an update is merited. As will be discussed below, the decoder may make quality judgments about the received encoded slice(s) and determine for itself whether or not to make an update to its HQRF. Because such a determination is not explicitly directed by the encoder, such a determination may be viewed as implicit.

Figure 4:
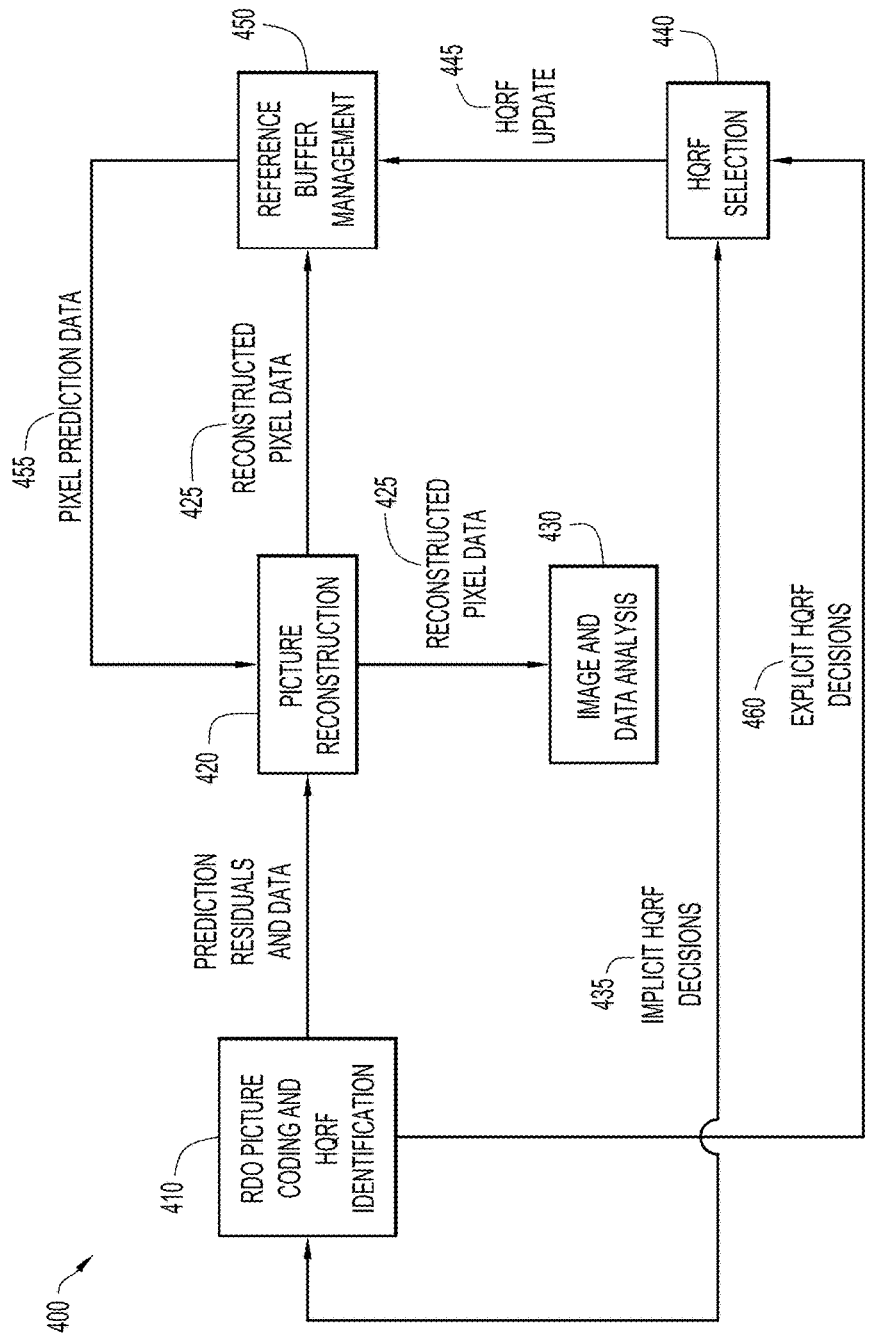
FIG. 4 is a block diagram of logic at an encoder, according to an example embodiment.

FIG. 4 is a block diagram of logic modules at an encoder, according to an embodiment. The illustrated modules may be implemented in hardware (e.g., fixed digital logic gates), software, firmware, (e.g., programmable logic gates) or any combination thereof in various embodiments. Generally, the illustrated modules collectively perform encoding of video and generation of explicit update instructions. Moreover, explicit instructions are generated in view of any implicit update decision that the decoder may make. An adequate implicit update decision at the decoder would obviate the need for an explicit update command, for example. Conversely, an implicit update decision generated by the decoder may not be sufficient; in this case, an explicit update instruction would be necessary from the encoder. For these reasons, it can be necessary to determine the implicit decision that would be made at the decoder.

This is seen in the illustrated embodiment. Module 410 performs picture coding and identification of the background (i.e., the HQRF). In the illustrated embodiment, the coding includes generation of one or more parameters to be used in a rate distortion optimization (RDO) calculation. Such parameters can be used as metrics in the determination of the quality of a frame, as is understood by persons or ordinary skill in the art. Explicit HQRF update decisions 460 are generated by module 410 and provided to an HQRF selection module 440.

Prediction residuals and other data 415 resulting from the coding process of 410 are provided to a picture reconstruction module 420 and to an image and data analysis module 430. The pixel reconstruction module 420 generates reconstructed pixel data 425 on the basis of the received prediction residuals and data 415 and on the basis of pixel prediction data 455 received from a reference buffer management module 450. The reconstructed pixel data 425 is sent to the reference buffer management module 450.

The reconstructed pixel data 425 is also sent to image and data analysis module 430, along with the prediction residuals and data 415. The image and data analysis module 430 generates an implicit HQRF update decision 435, based on these inputs. This update decision 435 is forwarded to HQRF selection module 440. This latter module then generates an update 445 of the HQRF, representative of either the implicit update decision 435 or explicit decision 460. The HQRF decision 445, if explicit, is sent to the video decoder.

Figure 5:
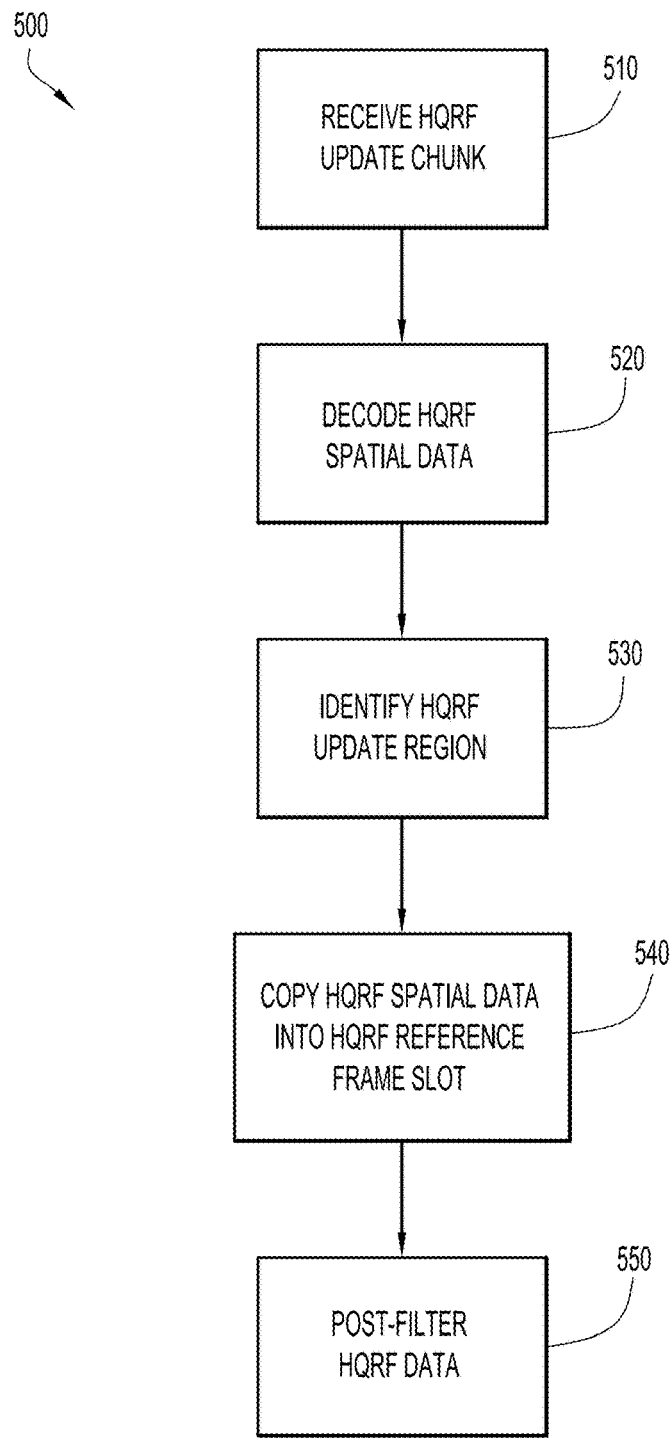
FIG. 5 is a flowchart illustrating an update process at a decoder, according to an example embodiment.

Update processing at the decoder is illustrated in FIG. 5, according to an embodiment. In the illustrated embodiment, one or more encoded slices (representing the update) are received by the video decoder at 510. In addition to the encoded slices, an explicit command (not shown) may be received instructing the decoder to use the slices in updating the background reference frame. Alternatively, no explicit command may be received; instead, it may be understood that any received encoded slices are to be used for update purposes. In either case, the update decision is not made by the decoder in such situations.

The data is decoded at 520. At 530, the portion of the background reference frame to be updated is identified at 530. In an embodiment, parameters identifying this portion may be part of the data transmitted to the decoder from the encoder. At 540, the decoded data is copied into the appropriate location (sometimes called a "slot") in the background reference frame at the video decoder. At 550, any necessary post-filtering may be performed.

Figure 6:
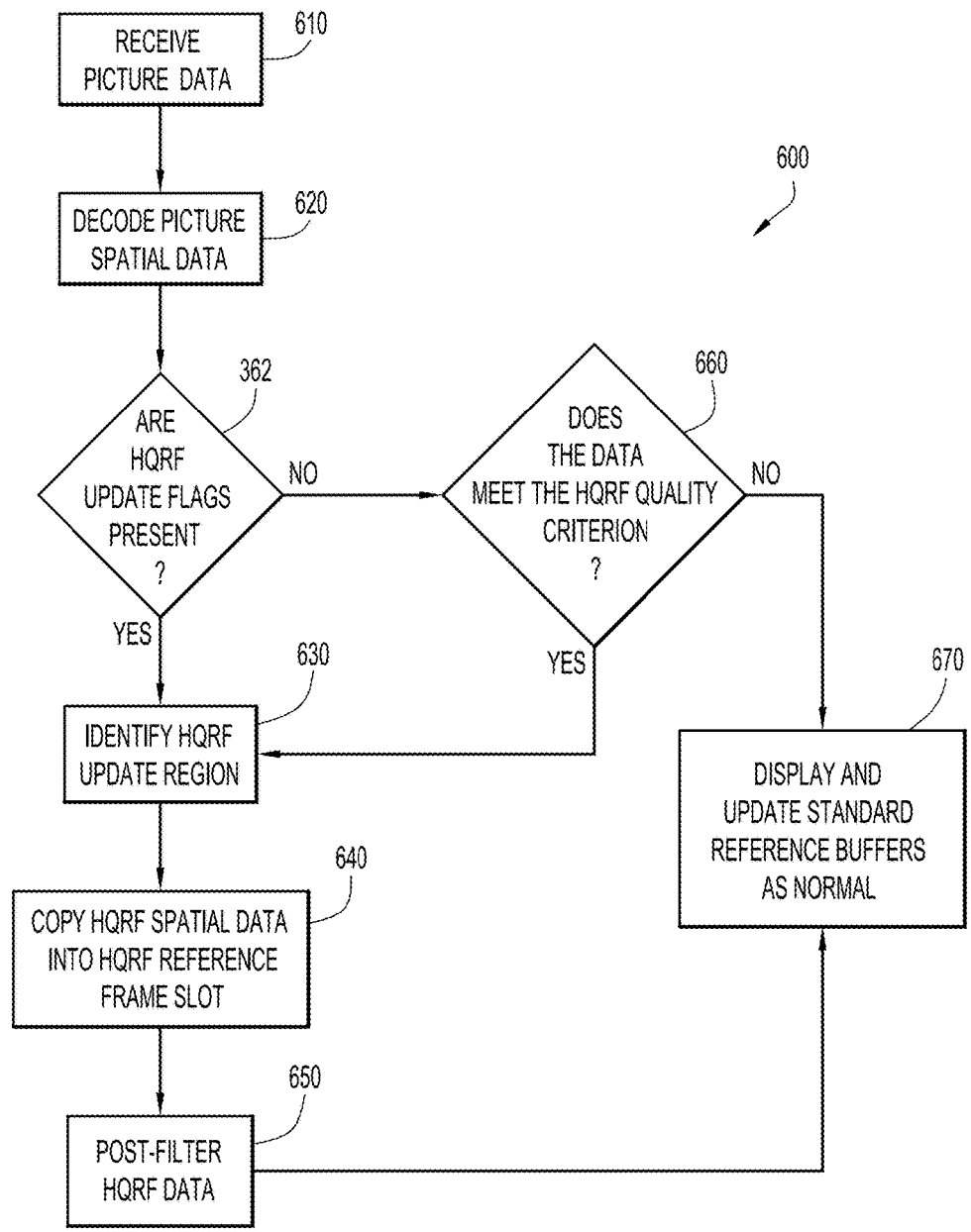
FIG. 6 is a flowchart illustrating an update process at a decoder, according to an example alternative embodiment.

FIG. 6 illustrates an embodiment where the decoder may either receive an explicit direction to update the background reference frame, or make a local determination to update the background reference frame. At 610, picture data is received. At 620, decoding is performed. At 625, a determination is made as to whether an explicit update instruction is present. In the illustrated embodiment, such an instruction takes the form of an HQRF update flag. If so, then the process continues at 630, where the region of the HQRF to be updated is identified. At 640, HQRF data (which was decoded at 620) is copied into the corresponding slot of the decoder's reference frame. At 650, any necessary post-filtering is performed on the copied HQRF data. At 670, the reference buffer(s) are updated and display can proceed.

If no HQRF update flags are detected at 625, then the process continues at 660. Here, a determination is made as to whether an implicit update is necessary, by deciding if the decoded picture data meets a predetermined quality criterion. As noted above, in an embodiment, this criterion may be quantified as a quality metric, such as an RDO parameter. If so, then the process continues at 630. Otherwise, no update is performed, and any necessary buffer updating can proceed, along with display, at 670.

Figure 7:
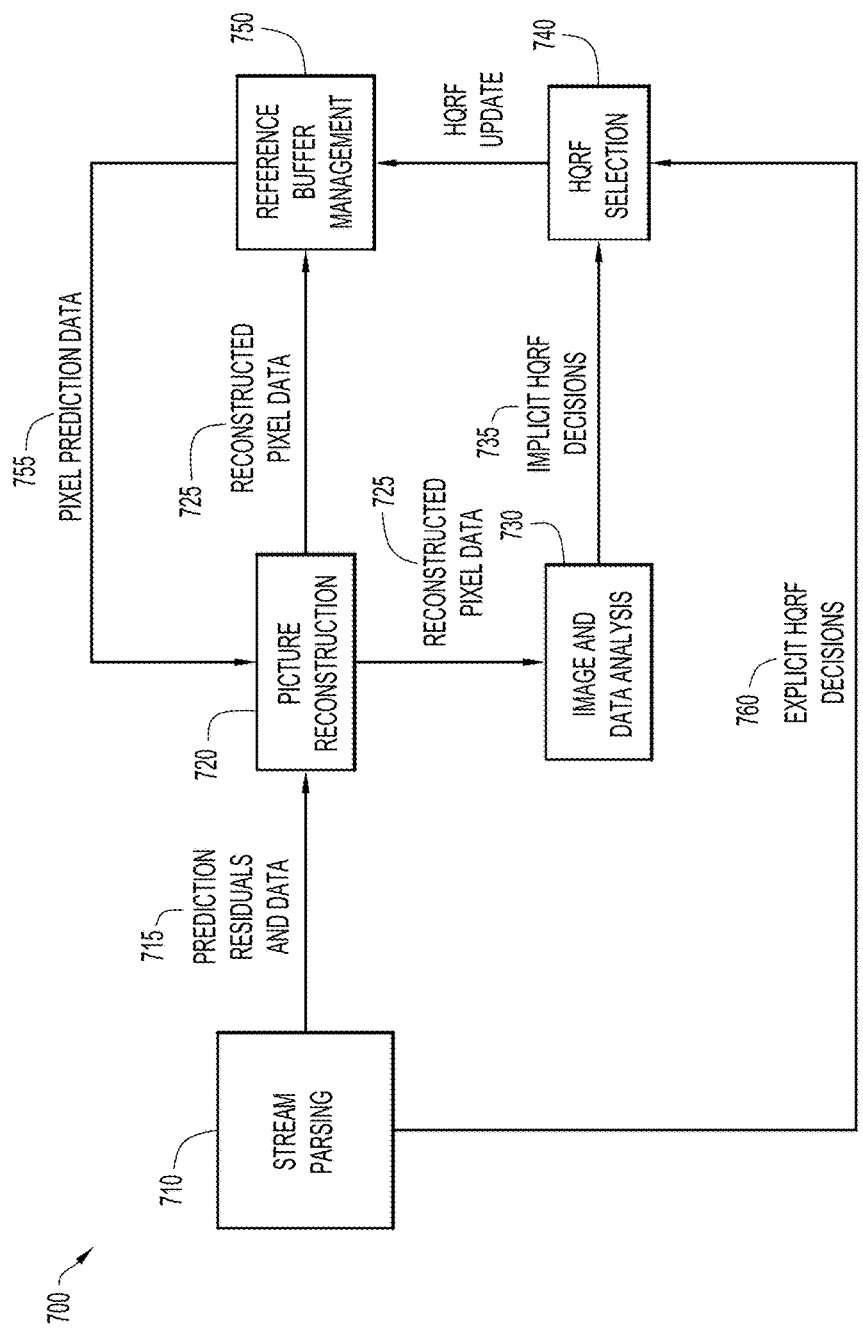
FIG. 7 is a block diagram of logic at a decoder, according to an example embodiment.

FIG. 7 is a block diagram of logic modules at a decoder, according to an embodiment. The illustrated modules may be implemented in hardware, software, firmware, or any combination thereof in various embodiments. Generally, the illustrated modules collectively perform decoding of video and execution of any explicit update instruction. Such an explicit instruction (if any) is processed in view of any implicit update decision that the decoder may make.

Module 710 parses a received data stream. If detected, explicit HQRF update decisions 760 are generated by module 710 and provided to an HQRF selection module 740. Prediction residuals and other data 715 resulting from the parsing process of 710 are provided to a picture reconstruction module 720 and to an image and data analysis module 730. The pixel reconstruction module 720 generates reconstructed pixel data 725 on the basis of the received prediction residuals and data 715 and on the basis of pixel prediction data 755 received from a reference buffer management module 750. The resulting reconstructed pixel data 725 is sent to the reference buffer management module 750.

The reconstructed pixel data 725 is also sent to image and data analysis module 730, along with the prediction residuals and data 715. The image and data analysis module 730 generates an implicit HQRF update decision 735, based on these inputs. This update decision 735 is forwarded to HQRF selection module 740. This latter module then generates an update 745 of the HQRF, representative of either the implicit update decision 735 or explicit decision 760.

Figure 8:
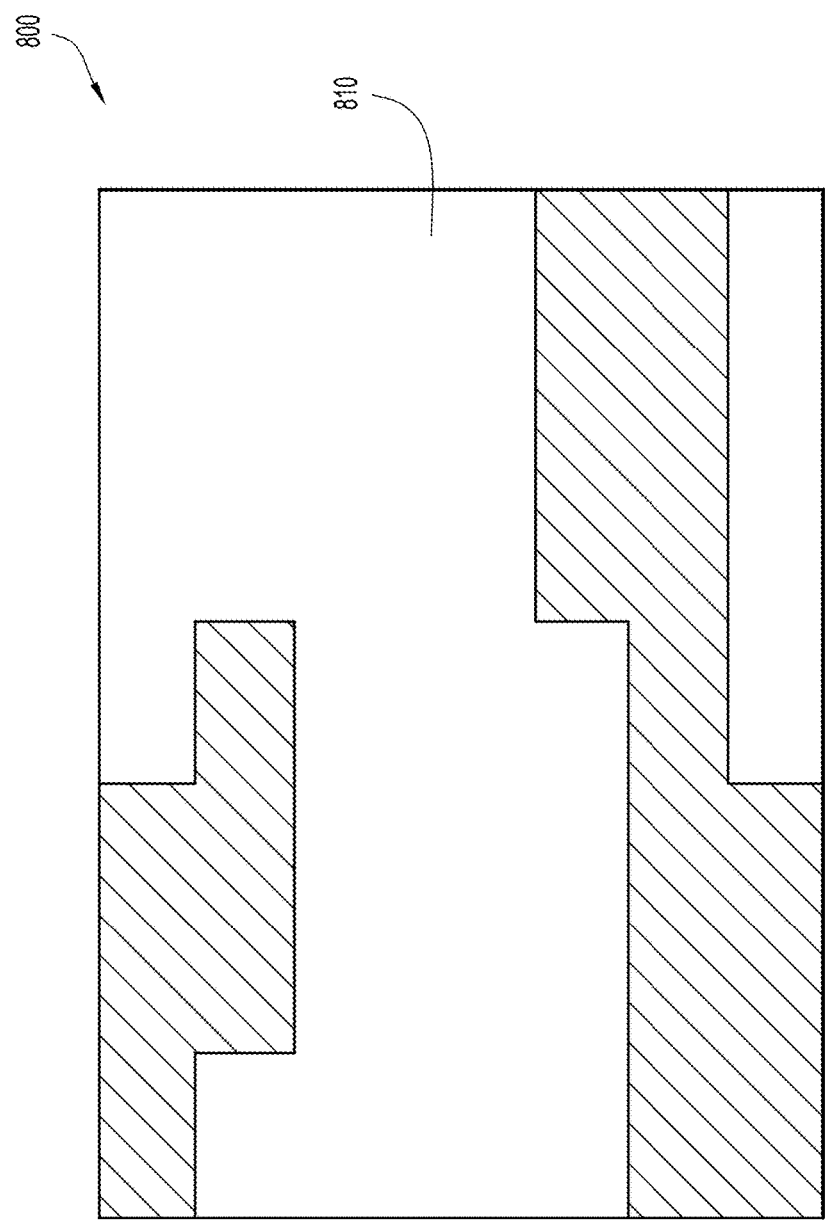
FIG. 8 illustrates a background reference frame, according to an example embodiment.

Examples of the results of the above processing are shown in FIGS. 8 and 9A-9C. FIG. 8 shows a background reference frame, where the HQRF is incomplete, i.e., does not cover the entire area of the frame. In some situations, this may represent the extent of the HQRF, where the remaining portion 810 of the frame is covered by default data, such as lower quality image data. In other situations, this may represent the state of the background reference frame if it has been only partially transmitted or updated.

Figure 9A:
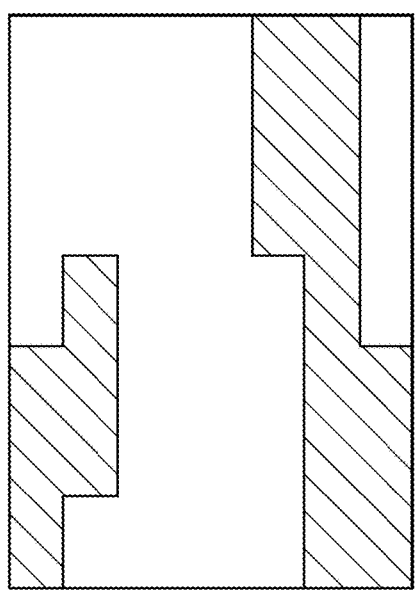
FIG. 9A illustrates a reference frame with an incomplete high quality reference frame.
Figure 9B:
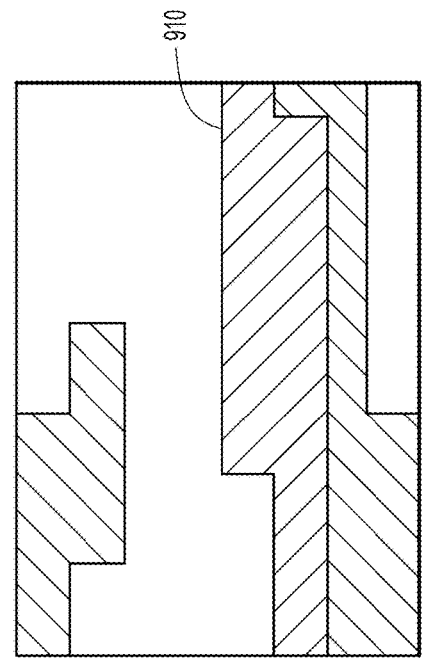
FIG. 9B illustrates a reference frame after an update process, showing the updated portion of the reference frame, according to an example embodiment.
Figure 9C:
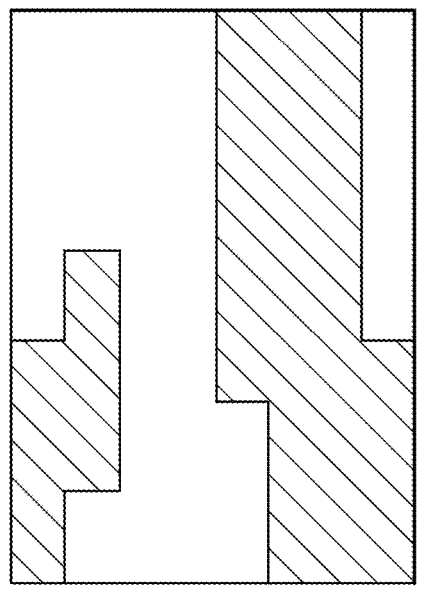
FIG. 9C illustrates an update reference frame, according to an example embodiment.

In the example of FIG. 9A, a background reference frame represents a frame with an incomplete HQRF. After an update process, the results of which are shown in FIG. 9B, new data (shown at reference numeral 910) is written to the frame. In this example, the update covers some of the space that was previously uncovered by HQRF data and overwrites some of the space that was previously covered. The results of this are shown in FIG. 9C.

Figure 10:
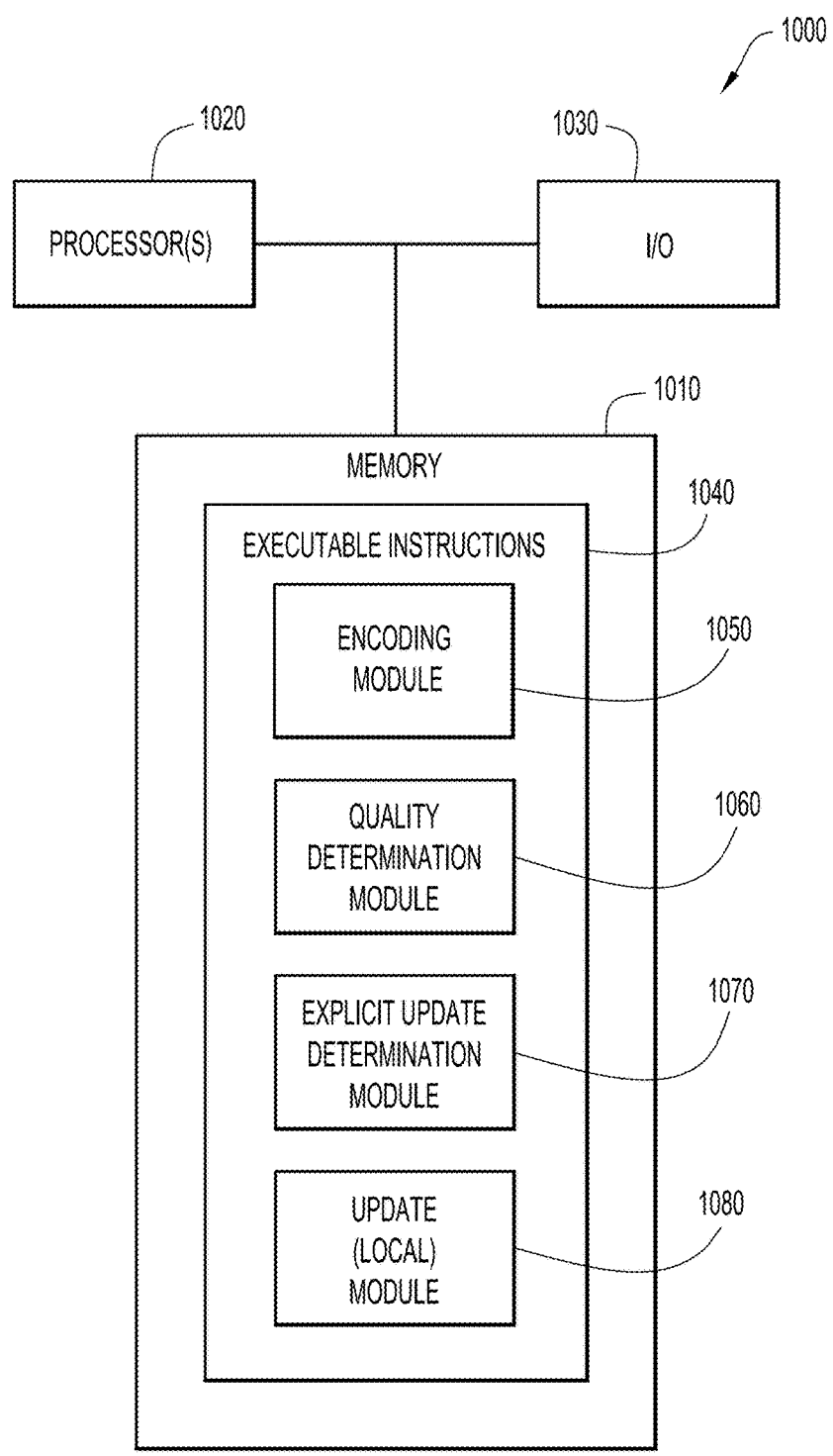
FIG. 10 is a block diagram illustrating a computing environment of an encoder, according to an example embodiment.

In an embodiment, the above processing at the encoder and/or decoder is implemented in software or firmware. A software embodiment of the encoder is illustrated in FIG. 10. Computing system 1000 includes one or more memory devices, shown collectively as memory 1010. Memory 1010 is in communication with one or more processors 1020 and input/output ports and devices shown collectively as I/O 1030. In one form, the I/O 1030 includes a network interface unit that enables communication over a network, such as network 150 of FIG. 1.

Memory 1010 may comprise read only memory (ROM), random access memory (RAM), magnetic disk storage media devices, optical storage media devices, flash memory devices, electrical, optical, or other physically tangible (i.e., non-transitory) memory storage devices. Memory 1010 stores data as well as executable instructions 1040. Instructions 1040 are executable on processor(s) 1020. The processor(s) 1020 comprise, for example, a microprocessor or microcontroller that executes instructions 1040. Thus, in general, the memory 1010 may comprise one or more tangible (non-transitory) computer readable storage media (e.g., memory device(s)) encoded with software comprising computer executable instructions. When the software is executed (by the processor(s) 1020) the software is operable to perform the operations described herein.

In the illustrated embodiment, the executable instructions 1040 include several modules. These include an encoding module 1050 configured to encode one or more slices of a background reference frame, such as an HQRF. Instructions 1040 also include a quality determination module 1060 configured to perform quality analysis to determine if the newly encoded data meets quality criteria for the background reference frame. As discussed above, this determination may include evaluation of one or more numerical quality parameters, e.g., an RDO parameter. Instructions 1040 also include a module 1070 for determination of the need for an explicit update. In an embodiment, module 1070 includes instructions for the generation of a flag or other command to be sent to the decoder, indicating the need for an update of the background reference frame. Instructions 1040 also include an update module 1080 for performing updates to the local copy of the background reference frame.

Figure 11:
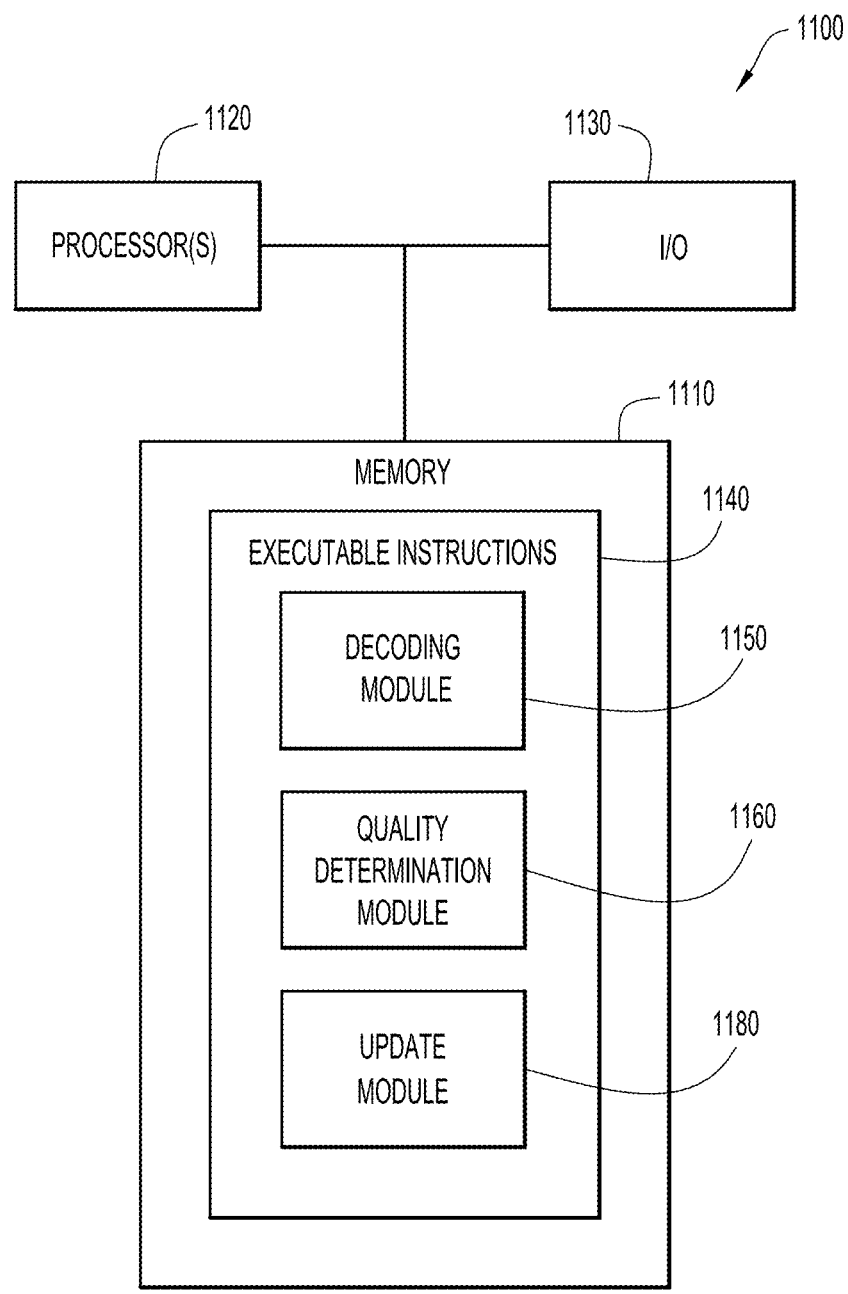
FIG. 11 is a block diagram illustrating a computing environment of a decoder, according to an example embodiment.

A software embodiment of the decoder is illustrated in FIG. 11. Computing system 1100 includes one or more memory devices, shown collectively as memory 1110. Memory 1110 is in communication with one or more processors 1120 and input/output ports and devices shown collectively as I/O 1130. In one form, the I/O 1130 includes a network interface unit that enables communication over a network, such as network 150 of FIG. 1.

Memory 1110 may comprise ROM, RAM, magnetic disk storage media devices, optical storage media devices, flash memory devices, electrical, optical, or other physically tangible (i.e., non-transitory) memory storage devices. Memory 1110 stores data as well as executable instructions 1140. Instructions 1140 are executable on processor(s) 1120. The processor(s) 1120 comprise, for example, a microprocessor or microcontroller that executes instructions 1140. Thus, in general, the memory 1110 may comprise one or more tangible (non-transitory) computer readable storage media (e.g., memory device(s)) encoded with software comprising computer executable instructions. When the software is executed (by the processor(s) 1120) the software is operable to perform the operations described herein.

In the illustrated embodiment, the executable instructions 1140 include several modules. These include a decoding module 1150 configured to decode one or more received slices of a background reference frame, such as an HQRF. Instructions 1140 also include a quality determination module 1160 configured to perform quality analysis to determine if the decoded data meets quality criteria for the background reference frame. As discussed above, this determination may include evaluation of one or more numerical quality parameters. Instructions 1140 also include a module 1180 for performing updates to the background reference frame.

The above description provides a method comprising, at each of a plurality of time intervals, sending one or more coded, high fidelity portions of a background reference frame to a video decoder; and storing the one or more portions in a buffer, wherein, after the plurality of time intervals, some or all of a high fidelity background reference frame has been stored in the buffer.

In another form, a video encoder is provided, comprising a picture reconstruction module, configured to process one or more coded high fidelity portions of a background reference frame that are received from a video encoder at each of a plurality of time intervals; and a buffer configured to store some or all of a background reference frame comprising the decoded portions after the plurality of time intervals.

In still another form, computer readable non-transitory storage media are provided encoded with software comprising computer executable instructions, where the instructions, when executed by a processor, cause the processor to, at each of a plurality of time intervals, send one or more coded, high fidelity portions of a background reference frame to a video decoder; and store the one or more portions in a buffer, wherein, after the plurality of time intervals, some or all of a high fidelity background reference frame has been stored in the buffer.

The above description also provides a method comprising, at each of a plurality of time intervals, receiving one or more coded, high fidelity portions of a background reference frame from a video encoder; decoding the one or more portions; and storing the one or more decoded portions in a buffer, wherein, after the plurality of time intervals, some or all of a background reference frame has been stored in the buffer.

In another form, a video decoder is provided, comprising a picture reconstruction module, configured to decode one or more coded high fidelity portions of a background reference frame that are received from a video encoder and each of a plurality of time intervals; and a buffer configured to store some or all of a background reference frame comprising the decoded portions after the plurality of time intervals.

In still another form, non-transitory computer readable storage media are provided encoded with software comprising computer executable instructions, where the instructions, when executed by a processor, cause the processor to, at each of a plurality of time intervals, receive one or more coded, high fidelity portions of a background reference frame from a video encoder; decode the one or more portions; and store the one or more decoded portions in a buffer, wherein, after the plurality of time intervals, some or all of a background reference frame has been stored in the buffer.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method of creating a background reference frame at a video decoder comprising:
   at each of a plurality of time intervals, wherein each time interval is 0.5 seconds to 5.0 seconds in length,
   receiving one or more coded, high fidelity portions of a background reference frame from a video encoder;
   decoding the one or more portions; and
   storing the one or more decoded portions in a buffer such that, after the plurality of time intervals, some or all of a background reference frame is stored in the buffer.

2. The method of claim 1, wherein each portion represents 1 to 2% of the background reference frame.

3. The method of claim 1, further comprising: receiving subsequent data that is predictively coded by reference to data in the background reference frame.

4. The method of claim 3, further comprising: prediction that is performed on the subsequently received data using a partially complete background reference frame.

5. The method of claim 4, wherein the background reference frame comprises incomplete regions that contain default data, the default data comprising data from another reference frame or a constant tone color.

6. The method of claim 1, further comprising:
receiving an updated portion of the background reference frame;
decoding the updated portion to produce a decoded updated portion; and
as a result of an explicit instruction from the video encoder, overwriting a corresponding portion of the background reference frame in the buffer, using the decoded updated portion.

7. The method of claim 6, wherein the overwriting is initiated as a result of an explicit instruction from the video encoder.

8. The method of claim 6, wherein the overwriting is initiated as a result of a determination, at the video decoder, that the updated portion is of superior quality relative to the corresponding portion of the background reference frame.

9. A video decoder, comprising:
a processor to decode one or more coded high fidelity portions of a background reference frame that are received from a video encoder and each of a plurality of time intervals, wherein each time interval is 0.5 to 5.0 seconds in length; and
a buffer that stores some or all of a complete background reference frame comprising the decoded portions after the plurality of time intervals.

10. The method of claim 9, wherein each portion represents 1 to 2% of the entire background reference frame area.

11. The video decoder of claim 9, wherein the buffer is a buffer dedicated to storage of the entire background reference frame.

12. The video decoder of claim 9, wherein the processor decodes an updated portion of the background reference frame to produce a decoded updated portion, and overwrites a portion of the background reference frame in the buffer, using the decoded updated portion.

13. The video decoder of claim 12, wherein the processor overwrites the portion of the background reference frame as a result of a determination that the updated portion is of superior quality relative to the corresponding portion of the completed background reference frame.

14. The video decoder of claim 12, wherein the processor overwrites the portion of the background reference frame as a result of an explicit instruction from the video encoder.

15. One or more non-transitory computer readable storage media encoded with software comprising computer executable instructions that when executed by a processor, cause the processor to:
at each of a plurality of time intervals,
receive one or more coded, high fidelity portions of a background reference frame from a video encoder, wherein each portion represents 1 to 2% of the background reference frame;
decode the one or more portions; and
store the one or more decoded portions in a buffer, such that after the plurality of time intervals, some or all of a complete background reference frame is stored in the buffer.

16. The computer readable storage media of claim 15, wherein each time interval is 0.5 seconds to 5.0 seconds in length.

17. The computer readable storage media of claim 15, wherein the computer executable instructions further comprise instructions that cause the processor to receive a low fidelity background reference frame prior to receiving the high fidelity portions.

18. The computer readable storage media of claim 15, wherein the instructions that cause the processor to store the one or more decoded portions in a buffer comprise instructions that cause the processor to store the one or more decoded portions and a dedicated buffer.

19. The computer readable storage media of claim 15, wherein the computer executable instructions further comprise instructions that cause the processor to:
receive an updated portion of the background reference frame;
decode the updated portion to produce a decoded updated portion; and
overwrite a corresponding portion of the background reference frame in the buffer, using the decoded updated portion.

20. The computer readable storage media of claim 19, wherein the instructions that cause the processor to overwrite are executed as a result of a determination, at the video decoder, that the updated portion is of superior quality relative to the corresponding portion of the background reference frame.

21. The computer readable storage media of claim 19, wherein the instructions that cause the processor to overwrite are executed as a result of an explicit instruction from the video encoder.

22. The computer readable storage media of claim 15, further comprising instructions to cause the processor to receive subsequent data that is predictively coded by reference to data in the background reference frame.

23. The computer readable storage media of claim 22, further comprising instructions to cause the processor to perform prediction on the subsequently received data using a partially complete background reference frame.

* * * * *